(12) United States Patent
Maisch

(10) Patent No.: US 7,000,381 B2
(45) Date of Patent: Feb. 21, 2006

(54) DEVICE FOR EXHAUST GAS AFTER TREATMENT OF MOTOR VEHICLES, IN PARTICULAR, DIESEL ENGINE VEHICLES

(75) Inventor: Dieter Maisch, Kohlberg (DE)

(73) Assignee: Hydraulik-Ring GmbH, Nürtingen (DE)

( * ) Notice: Subject to any disclaimer, the term of this patent is extended or adjusted under 35 U.S.C. 154(b) by 108 days.

(21) Appl. No.: 10/604,274

(22) Filed: Jul. 8, 2003

(65) Prior Publication Data
US 2004/0103641 A1 Jun. 3, 2004

(30) Foreign Application Priority Data
Jul. 11, 2002 (DE) .................. 102 31 216

(51) Int. Cl.
*F01N 3/00* (2006.01)

(52) U.S. Cl. .......................... 60/286; 60/295; 60/303; 123/498; 239/102.1; 239/102.2; 251/129.06; 310/327

(58) Field of Classification Search .................. 60/274, 60/286, 295, 303; 123/498; 239/102.1, 239/102.2; 251/129.06; 310/326, 327
See application file for complete search history.

(56) References Cited

U.S. PATENT DOCUMENTS

| | | | | |
|---|---|---|---|---|
| 4,955,339 A * | 9/1990 | Sasaki et al. | ................ | 123/295 |
| 5,394,852 A * | 3/1995 | McAlister | .................... | 123/494 |
| 5,522,218 A * | 6/1996 | Lane et al. | .................... | 60/274 |
| 5,787,708 A * | 8/1998 | Lane et al. | .................... | 60/301 |
| 6,032,652 A * | 3/2000 | Nozawa et al. | ............. | 123/478 |
| 6,146,102 A * | 11/2000 | Otome et al. | .................. | 417/45 |
| 6,513,323 B1 * | 2/2003 | Weigl et al. | .................. | 60/286 |
| 6,526,746 B1 * | 3/2003 | Wu | ............................ | 60/286 |
| 6,539,708 B1 * | 4/2003 | Hofmann et al. | ............. | 60/286 |

* cited by examiner

*Primary Examiner*—Binh Q. Tran
(74) *Attorney, Agent, or Firm*—Gundrun E. Huckett

(57) ABSTRACT

A device for exhaust gas after treatment of motor vehicles has a pump device for supplying a solution to the exhaust gas manifold. The pump device is a metering pump having a connecting part that opens into the exhaust gas manifold. The pump device has a piston and a piezo element for actuating the piston. The pump device has a housing provided with a housing chamber. The connecting part is arranged in the housing chamber that is located at an end face of the housing. The pump device has a pressure chamber for receiving the solution. A first check valve closes off the pressure chamber relative to the connecting part. The housing of the pump device has a supply line, and the piston sucks in the solution from the supply line. The pump device has a second check valve for closing off the supply line.

26 Claims, 2 Drawing Sheets

DEVICE FOR EXHAUST GAS AFTER TREATMENT OF MOTOR VEHICLES, IN PARTICULAR, DIESEL ENGINE VEHICLES

BACKGROUND OF INVENTION

1. Field of the Invention

The invention relates to a device for exhaust gas after treatment of motor vehicles, in particular, diesel engine vehicles, comprising at least one pump device for supplying a solution to an exhaust gas manifold.

2. Description of the Related Art

For exhaust gas after treatment in diesel combustion engines, preferably in trucks and passenger cars, a significant reduction of nitrogen oxide emissions is demanded. In the past, by means of a commercially available pump the required amount of an aqueous urea solution was pumped from a storage tank and, at a certain pressure, supplied via a filter to an injection valve. The supply line may comprise additionally a hydraulic storage element. The injection valve meters the desired amount of aqueous urea solution into a stream of air. This stream of air is taken from the network provided on board the vehicle and is supplied via a shut-off valve at a certain pressure, adjusted by means of a pressure reducing valve, into a mixing path. This stream of air entrains the injected aqueous urea solution. This mixture or mist is supplied via a supply line to the injection valve provided at the exhaust gas manifold and is injected upstream of a selective catalytic reduction (SCR) catalytic converter into the exhaust gas flow. The quantity of aqueous urea solution added in this way must be supplied via the injection valve as a function of the current operating state of the vehicle in a extremely precisely metered quantity. However, with such injection valves, such extremely precise metering actions can be achieved only with difficulty. Moreover, this precise metering cannot be ensured over an extended period of time.

SUMMARY OF INVENTION

It is an object of the present invention to configure a device of the aforementioned kind such that, in a constructively simple and inexpensive way, it can provide a very high metering precision of the required supply of aqueous urea solution needed for reducing the nitrogen oxide emissions, or of any other liquid.

In accordance with the present invention, this is achieved in that the pump device is a metering pump which has at least one connecting part opening into the exhaust gas manifold and in that the pumping device has at least one piston that is actuated by means of at least one piezo element.

As a result of the configuration according to the invention, the pump device is connected directly by means of the connecting part to the exhaust gas manifold and the aqueous urea solution, or any other liquid, is directly injected into the exhaust gas at the catalytic converter. By employing a piezo pumping device the liquid is conveyed by means of a suction filter directly from the storage container and is metered very precisely into the exhaust gas. The employed piezo element can be controlled continuously at a frequency of zero to several hundred Hertz so that the piston can be reciprocated with a pre-determined frequency. For each stroke only a very minimal amount of liquid is conveyed so that the pump device ensures the desired very high metering precision without problems. The piezo element and the piston are constructively simple parts which can be manufactured inexpensively. The device according to the invention takes over the function of the pump as well as that of an injection valve. According to this configuration, it is not necessary to provide air so that with the device according to the invention the nitrogen oxide emissions for diesel combustion engines can be significantly reduced in a simple way.

DETAILED DESCRIPTION

Figure 1:
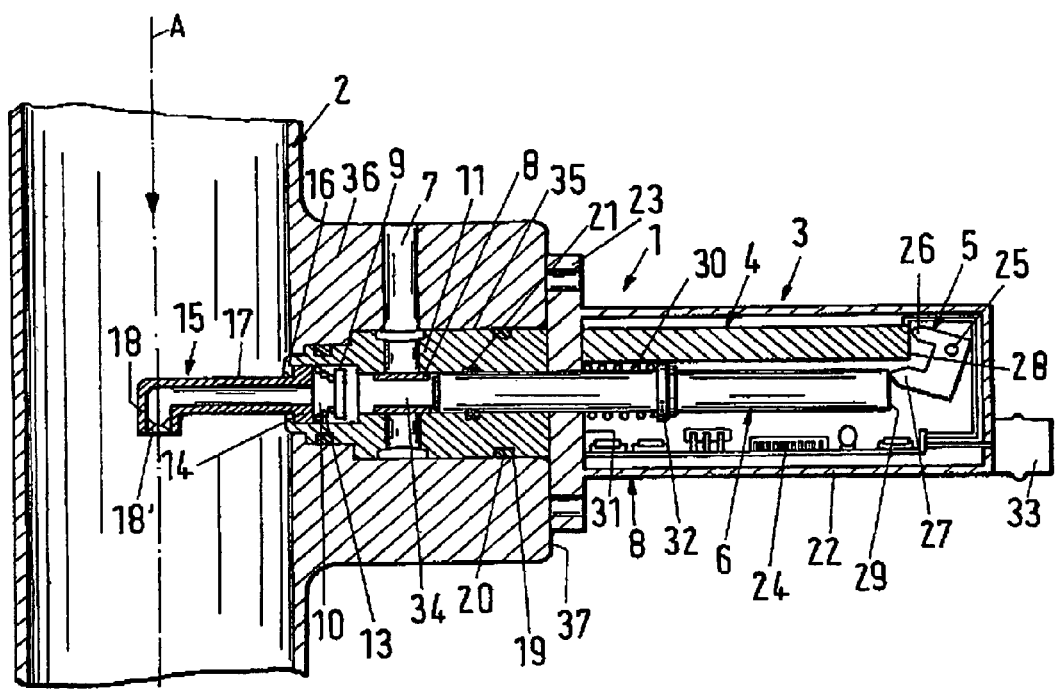
FIG. 1 shows in axial section a device according to the invention for exhaust gas after treatment comprising a connecting part that opens into an exhaust gas pipe of an exhaust gas manifold and comprising at least one piezo element, shown here in an expanded position.

FIG. 1 shows an exhaust gas after treatment device 1 connected to an exhaust gas pipe 2 of an exhaust gas manifold of a motor vehicle, preferably, a diesel engine vehicle. By means of the device, an aqueous urea solution is injected directly into the exhaust gas pipe 2 in order to reduce, as is known in the art, the nitrogen oxide emissions. The device 1 has a pump device 3 provided with at least one piezo element 4 that, by means of a transmission element 5, moves the piston 6. The piston 6 is slidably supported in a central bore 12 of the housing 11.

The supply line 7 opens radially into the bore 12; the aqueous urea solution is supplied from a storage container through the supply line 7. The supply line 7 can be closed relative to the bore 12 by a check valve 8. In the illustrated embodiment, the check valve 8 is formed by a metal strip that, in a closed position, rests with its periphery under prestress against the wall of the bore and in this way closes off the supply line 7 relative to the bore 12. The check valve 8 can also be sleeve-shaped or can have any other suitable shape or can be made of a different type of material, as long as it is ensured that the selected configuration and the selected material will provide the check valve 8 with a high frequency check valve function. The bore 12 opens into the bottom of a housing chamber 10 provided at the end face of the housing 11. A pressure spring 13 is arranged therein which secures a check valve 9 in its closed position. The pressure spring 13 rests with its end facing away from the slide piston 6 on a radially outwardly projecting terminal collar 14 of a connecting part 15 with which the exhaust gas after treatment device 1 opens into the exhaust gas pipe 2. The collar 14 rests against a projecting, preferably bent, rim 16 of the housing 11. Through the opening delimited by this rim 16 the tubular connecting part 15, having generally L shape, extends with its long leg 17. The connecting part 15 is positioned coaxially to the piston 6 and extends to a point where it intercepts the longitudinal axis of the exhaust gas pipe 2. Here, it passes into a short pipe leg 18 whose axis coincides with the longitudinal axis of the pipe 2. In the pipe leg 18 a nozzle 18 is arranged via which the aqueous urea solution is injected into the exhaust gas pipe 2.

The housing 1 is provided on its exterior with a peripheral recess 19 in which an annular seal or gasket 20 is arranged. The pump device 3 is inserted with the housing 11 into a mounting space 35 of a receptacle 36 provided on the exhaust gas pipe 2, wherein the seal or gasket 20 rests sealingly against the inner wall of the mounting space 35.

In the inner wall of the bore 12 at least one annular seal 21 is inserted for sealing the piston 6. It projects into a housing part 22 having a flange 23 that adjoins the housing 11. The pump device 3 is inserted into the mounting space 35 of the receptacle 36 until the flange 23, which projects radially past the housing 11 and the housing part 22, comes to rest against the end face 37 of the receptacle 36. The receptacle 36 is a radial socket of the exhaust gas pipe 2. The flange 23 is fastened by means of screws or the like on the end face 37.

In the housing part 22 a piezo element 4 is arranged as an actuating element. Of course, other types of actuating elements can be provided. The piezo element 4 is of an elongate configuration and connected to an electronic actuating device 24 provided in the housing part 22. The piezo element 4 is positioned parallel to the piston 6 extending in the housing part 22 of the housing 11. The movement of the piezo element 4 is transmitted by means of the transmission element 5 onto the piston 6. The transmission element 5 is configured as a two-arm lever pivotable about an axis 25; the axis extends perpendicularly to the piezo element 4 and to the piston 6. The transmission element 5 has two parallel arms 26, 27 that extend perpendicularly to the pivot axis 25 and rest against the end faces 28 and 29 of the piezo element 4 and of the piston 6, respectively. By pivoting the transmission element 5 about the axis 25, the piston 6 is moved in the corresponding direction, respectively.

The piston 6 is loaded in the direction toward the transmission element 5 by at least one pressure spring 30 which is supported with one end at the level of the end face 31 of the flange 23 of the housing part 22 and with its other end on the collar 32 of the piston 6. When the piezo element 4 is supplied with electric current, it expands so that the transmission element 5 is pivoted in the clockwise direction about the axis 25 (FIG. 1). The piston 6 is moved by the arm 27 of the transmission element 5 against the force of the pressure spring 30. Biased by the force of the pressure spring 30, the piston 6 always rests on the arm 27. When the piezo element 4 is not excited, it will shorten (contract) again, and the transmission element 5 is pivoted by the force of the pressure spring 30 via the piston 6 counter clockwise about the axis 25 (FIG. 2).

The free ends of the arms 26, 27 of the transmission element 5 are blade-shaped so that the pivot process of the transmission element 5 does not affect the slidability of the piston 6. On the exterior side of the housing part 22, a connector 33 is provided with which the parts of the electronic actuating device 24 can be supplied with current. The electronic actuating device 24 comprises a voltage amplifier as well as control electronics. The electronic actuating device 24 can also be provided separately exterior to the pump device 3.

In the rest position (FIG. 2) the piezo element 4 is not excited so that the piston 6 is in the retracted position. The piston 6 rests under the force of the pressure spring 30 on the arm 27 of the transmission element 5 which, in turn, rests with the other arm 26 on the end face 28 of the piezo element 4. The two check valves 8 and 9 are closed so that the bore 12 receiving the piston 6 is separated from the radial supply line 7.

Figure 2:
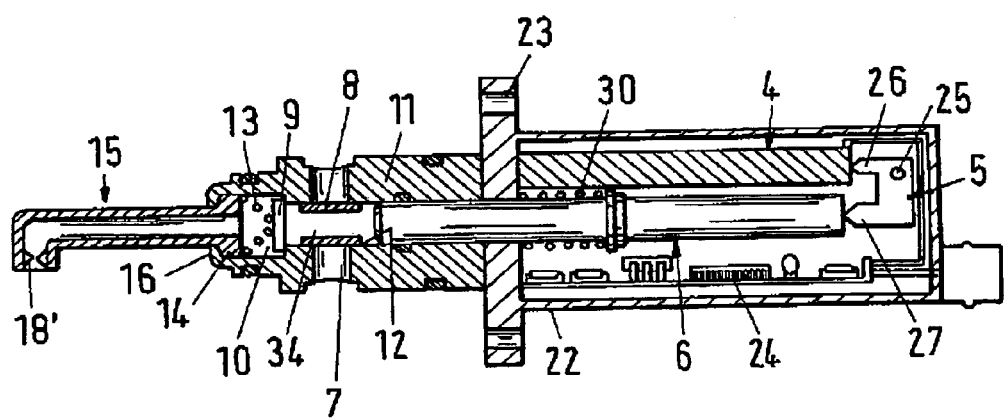
FIG. 2 is a device according to FIG. 1 without the exhaust gas pipe being shown, illustrating the piezo element in its initial or rest position.

When the piezo element 4 becomes longer (expands) because it is excited (electric current is supplied to it), the transmission element 5 is pivoted from the position illustrated in FIG. 2 within a very short period of time about the axis 25 in the clockwise direction. In this way, the piston 6 is moved to the left against the force of the pressure spring 30 in FIGS. 1 and 2. When doing so, the aqueous urea solution in the pressure chamber 34, delimited by the bore 12, the piston 6, and the check valves 8, 9, is compressed. The check valve 8 is closed as a result of the pressure build-up so that the bore 12 is separated from the supply line 7. As soon as the pressure in the chamber 34 becomes greater than the force of the pressure spring 13 acting on the check valve 9 and the system pressure present within the housing chamber 10, the check valve 9 is opened so that the pressurized aqueous urea solution can flow from the chamber 10 into the connecting pipe 15 and from there into the exhaust gas pipe 2.

With the described shortening (contraction) and expansion of the piezo element 4, the piston 6 is reciprocated in the bore 12 in the described way. When the piezo element 4 becomes longer (expands), the piston 6 moves in the direction of the opening 10 so that the pressure medium in the chamber 34 is compressed. As soon as the pressure in the pressure medium becomes greater than the force of the pressure spring 13 acting on the check valve 9, the check valve 9 will open. The pressure medium is then forced by the piston 6 in the described way into the exhaust gas pipe 2. When the piezo element 4 is contracted, the piston 6 is retracted in the described way. In this way, in the pressure chamber 34 a vacuum is generated which leads to the closing of the check valve 9 and the opening of the check valve 8. The aqueous urea solution is sucked via the supply line 7 into the pressure chamber 34 where it is compressed in the described way.

The piezo element 4, depending of the supplied frequency, can be expanded and contracted several thousand times per second and can therefore carry out precisely predetermined numbers of strokes. In this way, with a theoretically incompressible medium a defined solution flow can be adjusted.

The piezo element 4, depending on the decided geometric stroke volume, can act without the transmission element 5 directly on the piston 6. In this case, the piezo element 4 is arranged advantageously axially behind the piston 6 so that the piston 6 is moved directly upon contraction and expansion (elongation) of the piezo element 4 in a corresponding way.

By means of the pump device 3, the aqueous urea solution is injected upstream of a catalytic converter (not represented), preferably, a selective catalytic reduction catalytic converter, into the exhaust gas. The pump device 3 conveys the aqueous urea solution by means of a suction filter (not illustrated) directly from a storage container (also not illustrated) and takes over the precise metering of the aqueous urea solution into the exhaust gas pipe 2. This is possible in that the piezo piston pumps 3 can be controlled continuously at a frequency of zero to several hundred Hertz so that the piston 6 can be reciprocated at this predetermined frequency. Since with each stroke of the piston 6 only a very minute quantity of aqueous urea solution (or also any other liquid) is conveyed, the pump 3 can easily achieve the desired very high metering precision. In order for the device 1 to require only a minimal mounting space, the configuration of the pump device 3 includes the piston 6 and the piezo element 4 for moving the piston 6. The piezo element 4 and the piston 6 are constructively simple components which can be produced inexpensively. The actuating device 1 takes over the function of a pump as well as that of an injection valve. Since the device 1 does not require air, the motor vehicle in which this device is to be used must not have an integrated compressed air network. In the case of trucks, no compressed air is being used which is available only in minimal amounts in trucks.

The described pump device 3 can also be used as a substitute for the known injection valves for exhaust gas after treatment devices. Accordingly, a conventional pump is used in the tank as a conveying pump in the case that the suction height for the pump device 3 is too great. If the intake behavior of the pump device 3 itself is sufficient, the conventional pump can also be omitted and the pressure filter is replaced with a suction filter. In this situation, the described pump device 3, as in the above described configuration, takes over the task of conveying the liquid to be supplied to the exhaust gas and, at the same time, of metering the required quantity of the liquid.

While specific embodiments of the invention have been shown and described in detail to illustrate the inventive principles, it will be understood that the invention may be embodied otherwise without departing from such principles.

What is claimed is:

1. A device for exhaust gas after treatment of motor vehicles, the device comprising:
   at least one pump device for supplying a solution to an exhaust gas manifold of a motor vehicle;
   wherein the pump device is a metering pump having at least one connecting part;
   wherein the at least one connecting part opens into the exhaust gas manifold;
   wherein the at least one pump device comprises at least one piston;
   wherein the at least one pump device comprises a piezo element configured to actuate the at least one piston;
   wherein the at least one pump device has a housing provided with a housing chamber, wherein the at least one connecting part is arranged in the housing chamber;
   wherein the at least one connecting part has a terminal collar and the terminal collar is secured in the housing chamber; and
   wherein the at least one pump device further comprises a first check valve comprising at least one spring resting against the terminal collar.

2. The device according to claim 1, wherein the at least one connecting part is tubular.

3. The device according to claim 1, wherein the housing chamber is provided at an end face of the housing.

4. The device according to claim 1, wherein the at least one pump device has a transmission element connected to the piston and the piezo element.

5. A device for exhaust gas after treatment of motor vehicles, the device comprising:
   at least one pump device for supplying a solution to an exhaust gas manifold of a motor vehicle;
   wherein the pump device is a metering pump having at least one connecting part;
   wherein the at least one connecting part opens into the exhaust gas manifold;
   wherein the at least one pump device comprises at least one piston;
   wherein the at least one pump device comprises a piezo element configured to actuate the at least one piston;
   wherein the at least one pump device has a transmission element connected to the piston and the piezo element; and
   wherein the transmission element is a pivot lever.

6. The device according to claim 5, wherein the at least one pump has a housing with a housing chamber, and wherein the at least one connecting part has a terminal collar and wherein the terminal collar is secured in the housing chamber.

7. The device according to claim 6, wherein the at least one pump device further comprises a first check valve comprising at least one spring resting against the terminal collar.

8. The device according to claim 6, wherein the at least one connecting part is an L-shaped pipe having a long pipe leg and a short pipe leg, wherein the terminal collar is provided on the long pipe leg and wherein the short leg extends substantially coaxially to the exhaust gas manifold.

9. The device according to claim 5, wherein the at least one pump device has a pressure chamber for receiving the solution and wherein the first check valve is configured to close off the pressure chamber relative to the at least one connecting part.

10. The device according to claim 9, wherein the housing of the at least one pump device has a supply line and wherein the piston sucks in the solution from the supply line.

11. The device according to claim 10, wherein the at least one pump device has a second check valve configured to close the supply line.

12. The device according to claim 11, wherein the second check valve is selected from the group consisting of a radially elastically deformable metal part, a sheet metal part and a sleeve.

13. The device according to claim 11, wherein the second check valve opens the supply line in a direction toward the pressure chamber as a result of a suction force caused by a return movement of the piston.

14. The device according to claim 9, wherein the first check valve opens as a result of a pressure force caused by sliding of the piston in a direction toward the connecting part.

15. The device according to claim 5, wherein the transmission element has two arms resting against an end face of the piezo element and an end face of the piston, respectively.

16. The device according to claim 15, wherein the two arms are parallel to one another.

17. The device according to claim 16, wherein the transmission element has a stay connecting the two arms and wherein a pivot axis of the transmission element extends through the stay.

18. The device according to claim 17, wherein the pivot axis is perpendicular to a sliding direction of the piston.

19. The device according to claim 5, wherein the piezo element moves the piston against a counterforce.

20. The device according to claim 5, further comprising an electronic actuating device for actuating the piezo element.

21. The device according to claim 20, wherein the electronic actuating device is arranged in a housing of the at least one pump device.

22. The device according to claim 21, wherein the piezo element and the electronic actuating device are provided on opposed sides of the piston.

23. The device according to claim 21, wherein the electronic actuating device is arranged outside of the housing.

24. The device according to claim 21, wherein the housing has an electronic connector.

25. The device according to claim 21, wherein the housing has a mounting flange.

26. A device for exhaust gas after treatment of motor vehicles, the device comprising:
   at least one pump device for supplying a solution to an exhaust gas manifold of a motor vehicle;
   wherein the pump device is a metering pump having at least one connecting part;

wherein the at least one connecting part opens into the exhaust gas manifold;

wherein the at least one pump device comprising at least one piston;

wherein the at least one pump device comprises a piezo element configured to actuate the at least one piston;

wherein the at least one pump device has a transmission element connected to the piston and the piezo element; and wherein the piezo element and the piston extend parallel to one another.

* * * * *